United States Patent [19]

Miller et al.

[11] 3,969,122

[45] July 13, 1976

[54] FORMULATION FOR PRODUCING SODA-LIME GLASS INCLUDING COAL ASH

[75] Inventors: Karl A. Miller, Denver; Clement V. Fogelberg, Arvada, both of Colo.

[73] Assignee: Tusco Engineering Co., Inc., Commerce City, Colo.

[22] Filed: Dec. 16, 1974

[21] Appl. No.: 533,387

[52] U.S. Cl. .............................. 106/52; 106/DIG. 8
[51] Int. Cl.² ........................................... C03C 3/04
[58] Field of Search ................. 106/52, DIG. 8, 51, 106/50, DIG. 1

[56] References Cited
UNITED STATES PATENTS

| | | | |
|---|---|---|---|
| 1,724,747 | 8/1929 | Cochius | 106/52 |
| 2,229,770 | 1/1941 | Ramseyer | 106/50 |
| R26,328 | 1/1968 | Monks | 106/52 |

FOREIGN PATENTS OR APPLICATIONS

| | | | |
|---|---|---|---|
| 289,064 | 11/1971 | U.S.S.R. | 106/51 |

OTHER PUBLICATIONS

Weyl, W. A., *Coloured Glasses* – Dawson's Of Pall Mall, London, (1959), pp. 106–109, 254–256.
Shand – *Glass Engineering Handbook* – McGraw-Hill, N.Y., (1958), p. 4.

*Primary Examiner*—Helen M. McCarthy
*Attorney, Agent, or Firm*—Thomas W. O'Rourke

[57] ABSTRACT

A batch formulation for soda-lime glass comprising fine coal ash as an additional constituent which may be added either to the basic batch formulation prior to melting, or to the molten glass prior to processing into containers, flat glass or other such articles.

1 Claim, No Drawings

FORMULATION FOR PRODUCING SODA-LIME GLASS INCLUDING COAL ASH

BACKGROUND OF THE INVENTION

1. Field of the Invention

The present invention relates generally to soda-lime glass batch formulations including ash from the combustion of coal as a constituent, and further to methods of producing soda-lime glass by adding the coal ash to the batch constituents prior to melting or to the molten glass in the furnace.

2. Description of the Prior Art

Soda-lime glass is a term applied generally to one of the more common, utilitarian groups of glass formulations. Glass containers, table ware, lighting materials and flat glass are commonly produced from varying formulations of soda-lime glass. Typical ranges of constituents in representative formulations are:

|  | Glass Containers % by wt. | Lime Tableware and Lamp Bulbs % by wt. | Flat Glass Sheet & Plate % by wt. |
|---|---|---|---|
| $SiO_2$ | 71.5 – 73.5 | 70.0 – 72.5 | 71.0 – 73.0 |
| $Al_2O_3$ | .4 – 2.2 | .3 – 2.6 | .5 – 1.5 |
| CaO | 7.8 – 10.8 | 5.4 – 6.5 | 8.0 – 11.0 |
| MgO | .0 – 3.6 | 3.0 – 4.5 | 1.0 – 4.0 |
| BaO | .0 – .5 | — | — |
| $Na_2O$ | 12.5 – 15.5 | 15.8 – 17.0 | 13.0 – 15.0 |
| $K_2O$ | .4 – 1.0 | .3 – 1.2 | .3 – .8 |
| $B_2O_3$ | .0 – .2 | .0 – .5 | — |
| $Fe_2O_3$ | .04 – .05 | .03 – .04 | .06 – .1 |

The above basic formulations are for essentially uncolored glasses. Color is typically provided by adding additional iron sulfur trioxide or carbon, for instance.

Various other ingredients are often added to aid in the melting, refining, processing or coloring of the resulting glass. For instance, as an example of an unlikely constituent, slag from steel manufacture has been added in varying amounts. However, no prior use of coal ash as a constituent in soda-lime glass has been found.

Ash is the nonvolatile, noncombustible matter in coal. Ash thus remains after coal is burned. It typically constitutes on the order of 10 percent by weight of, for instance, western sub-bituminous coal.

Fine or fly ash is formed by burning coal in a pulverous form entrained in air. The resulting ash is in the form of small particles. Historically fly ash has been dissipated through stacks. However, with the increased use of scrubbers to remove the fly ash from the stack gases, substantially greater amounts of fly ash are being collected.

SUMMARY OF THE INVENTION

The present invention, which provides a heretofore unavailable source for glass-making materials and a means of utilizing fly ash, comprises the inclusion of coal fly ash in glass batch materials or as a distinct constituent an additive to molten glass.

Accordingly, an object of the present invention is to provide a new and improved formulation and method for producing glass utilizing coal fly ash.

Another object of the present invention is to provide a new and improved batch formulation and method for producing glass wherein fly ash is added directly to glass batch materials.

Yet another object of the present invention is to provide a new and improved formulation and method for producing glass in which coal fly ash is added directly to molten glass.

Still another object of the present invention is to provide a new and improved batch formulation and method for producing glass which incorporates coal fly ash and produces a batch which readily and completely melts to form glass.

Still another object of the present invention is to provide a new and improved batch formulation and method for producing glass which pours readily for processing.

A further object of the present invention is to provide a new and improved batch formulation and method for producing glass which may be conventionally processed without the formulation of substantial numbers of batch stones.

These and other objects and features of the present invention will become apparent from the following description.

DETAILED DESCRIPTION OF THE INVENTION

The ingredients utilized to form soda-lime glass serve several distinct purposes. For instance, silica and alumina are refractory constituents which largely influence the resulting physical properties of the glass upon cooling. Calcia, magnesia, sodium oxide and potassium oxide are materials which influence the melting temperature, melting ease, processing characteristics of the glass and are necessary for the economical, rapid production of high-quality glass. Iron, carbon, sulfur trioxide and titania are constituents which influence the coloring of glass and are, therefore, largely aesthetic considerations except in the instances where clear glass is necessary for viewing or when colored glass is necessary to protect against radiation.

It has been discovered that coal fly ash may be added in substantial amounts, i.e., 10 percent by weight or greater, to glass batch formulations or to molten glass while maintaining the physical strength, processing ease or, in the case of amber glasses, the coloration of the resulting glass. Since coal fly ash commonly includes iron, sulfur trioxide and titania, the aesthetic considerations may require somewhat lesser amounts of fly ash in a batch if transparent or colorless glass is required. However, tests have demonstrated that the melting ease, pouring and processing qualities, and presence of objectionable impurities or batch formulation-induced flaws such as batch stones are not adversely influenced by the inclusion of coal fly ash up to 10 percent by weight. Higher amounts can be used but, in view of the color-inducing properties of fly ash, it is not expected that more than 4 percent to 6 percent by weight of coal fly ash would be normally employed.

Three sample melts were made illustrating the results obtainable according to the method and formulation of the instant invention.

EXAMPLE I

Coal ash of the approximate analysis shown in the Table was added to the composition shown in the Table as Example I in an amount such as to comprise 10 percent by weight of the total materials. The resulting batch formulation composition was heated to an elevated temperature, melted, and allowed to cool to form a glass sample. Though the basic composition included only the fundamental constituents of soda-lime glass, the sample melted readily and produced a transparent green glass sample free of stones and other batch formulation related flaws and blemishes.

EXAMPLE II

A coal ash of the approximate analysis shown in the Table was added to a commercial glass batch formulation shown in the Table as Example II in such amount to comprise 5 percent by weight of the resulting batch formulation. The materials were formed into a glass sample as described above with regard to Example I. The glass sample processed well, was an opaque brown, and otherwise free of stones and other flaws and blemishes.

EXAMPLE III

The coal ash material of the above examples was added to a slightly altered commercial batch formulation, i.e., omission of the iron content from the basic batch as shown in the Table as Example III. The resulting formulation, which comprised 5.3 percent by weight coal ash, was formed into a glass sample as described with regard to the above Examples. The glass sample was a transparent brown as desired for commercial purposes and duplicated the original ash-free formulation of Example II. The materials melted and processed readily and were free of stones and other batch-related blemishes and flaws.

Summarily, the instant invention concerns a formulation and method for forming soda-lime glass utilizing rather substantial amounts of coal ash. Coal ash has been found to be entirely compatible with the soda-lime glass formulations. The only substantial variation induced by the coal ash concerns the tint or coloration of the glass, and this can be accommodated in most instances.

Although only three specific examples of the instant invention have been presented and discussed, many variations of the instant invention will be apparent to those skilled in the art, and such variations are intended to be within the scope of the invention as defined by the following claims.

What is claimed is:

1. A batch formulation for producing transparent glass, consisting essentially of 71.6 parts by weight of $SiO_2$, 2.2 parts by weight $Al_2O_3$, 10.8 parts by weight CaO, 14.7 parts by weight $Na_2O$, 0.7 parts by weight $SO_3$, and 0.2 parts by weight C, and 6 parts by weight coal ash, and in which the coal ash comprises 51.1 percent by weight $SiO_2$, 21.3 percent by weight $Al_2O_3$, 6.4 percent by weight $Fe_2O_3$, 8.2 percent by weight CaO, 0.9 percent by weight MgO, 5.7 percent by weight $Na_2O$, 1.2 percent by weight $SO_3$, and 1.1 percent by weight $TiO_2$.

* * * * *

TABLE

| Constituent | Ash % by wt. | Example I % by wt. | Example II % by wt. | Example III % by wt. |
| --- | --- | --- | --- | --- |
| Silica $SiO_2$ | 51.1 | 74 | 71.5 | 71.6 |
| Alumina $Al_2O_3$ | 21.3 | — | 2.2 | 2.2 |
| Iron $Fe_2O_3$ | 6.4 | — | .3 | — |
| Calcia CaO | 8.2 | 11 | 10.7 | 10.8 |
| Magnesia MgO | 0.9 | — | — | — |
| Sodium Oxide $Na_2O$ | 5.7 | 15 | 14.6 | 14.7 |
| Sulfur Trioxide $SO_3$ | 1.2 | — | .7 | .7 |
| Titania $TiO_2$ | 1.1 | — | — | — |
| Carbon C | — | — | 0.2 | 0.2 |